United States Patent [19]
Hasegawa et al.

[11] Patent Number: 5,313,308
[45] Date of Patent: May 17, 1994

[54] IMAGE FORMING APPARATUS WHICH CHANGES ITS TONE REPRODUCING PROPERTY IN ACCORDANCE WITH AMBIENT CONDITIONS

[75] Inventors: Takashi Hasegawa, Matsudo; Sono Gu, Ohmiya, both of Japan

[73] Assignee: Canon Kabushiki Kaisha, Tokyo, Japan

[21] Appl. No.: 574,050

[22] Filed: Aug. 29, 1990

[30] Foreign Application Priority Data

Aug. 31, 1989 [JP] Japan ................................ 1-225353
Aug. 31, 1989 [JP] Japan ................................ 1-225370

[51] Int. Cl.$^5$ ........................ H04N 1/29; H04N 1/46
[52] U.S. Cl. ................................ 358/406; 358/504; 358/300; 355/208
[58] Field of Search ............... 358/300, 406, 401, 504, 358/501; 346/160, 157; 355/208, 214, 246, 203, 30, 35

[56] References Cited

U.S. PATENT DOCUMENTS 4,681,424 7/1987 Kantor et al. ..................... 358/296
4,688,051 8/1987 Kawakami ..................... 346/76 PH
4,888,618 12/1989 Ishikawa ........................... 355/208

Primary Examiner—Edward L. Coles, Sr.
Assistant Examiner—Scott A. Rogers
Attorney, Agent, or Firm—Fitzpatrick, Cella, Harper & Scinto

[57] ABSTRACT

A color image forming apparatus includes an electrophotographic photosensitive member; a device for forming latent images by optical scanner with light information corresponding to colors; plural developing devices for developing in different colors; a detector for an ambient condition; and a device for changing a tone reproducing property of the latent image forming device using one of stored tables in accordance with an output of the detector.

36 Claims, 16 Drawing Sheets

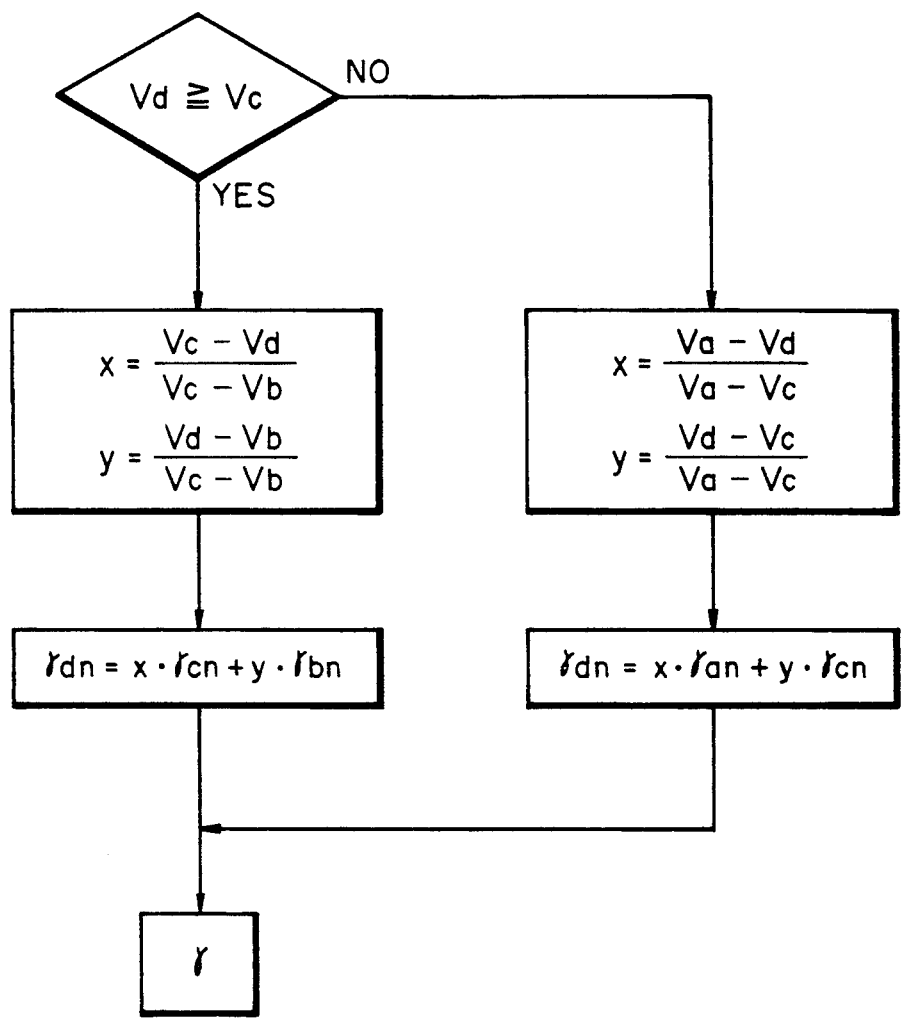
F I G. 24

IMAGE FORMING APPARATUS WHICH CHANGES ITS TONE REPRODUCING PROPERTY IN ACCORDANCE WITH AMBIENT CONDITIONS

FIELD OF THE INVENTION AND RELATED ART

The present invention relates to an image forming apparatus wherein input image data are processed to provide multi-tone image.

As for the method of reproducing halftone images, there are dither method or density pattern method. However, in either case, the tone reproducibility is not sufficient using a small size threshold matrix. Therefore, it is considered to use a large size threshold matrix, but if it is used, the resolution extremely lowers.

Besides the above methods, U.S. Pat. No. 4,873,537, for example, which has been assigned to the assignee of this application, has proposed a method by which the tone reproducibility is improved without deteriorating the resolution. In this method, digital image signals are converted to binary signals, and the image is formed using a laser beam printer or the like. In order to provide the good tone reproducibility, the digital signals are once converted to analog signals, which are in turn compared with a periodical pattern signal such as a triangular wave. On the basis of the comparison, the signals are converted to binary signals having been modulated in the pulse width thereof. The binary signals are used as the driving signals for the laser source. FIG. 2 shows an example of the levels of the analog signal and the triangular wave and the binary-coded signals which have been modulated in the pulse width.

By modulating the pulse widths of the digital image signals, both of the high resolution and the faithful reproducibility of the tone are accomplished. In order to faithfully reproduce the tone of the original, the input property of the original reading system and/or the output density property of the printer is taken into account, and the conversion is corrected thereby.

FIG. 3 is a block diagram of an image forming apparatus in the pulse width modulation system in the U.S. Patent, wherein $\gamma$-property (tone correction) is included.

The optical image information reflected by an unshown original is converted to an analog electric signal by a CCD (charge coupled device) 111. The analog electric signal produced by the CCD 111 is amplified to an appropriate level by an amplifier 112, and is converted to a digital signal by an A/D converter. The digital signal is subjected to a tone reproducing property correction by a tone ($\gamma$) corrector 114 to compensate various non-linear toner reproducing property from the image input to the image output. Generally, a ROM or the like storing tone reproducing correcting coefficient for the entire system is used. The coefficients are in a look-up table, and an input signal having a certain tone level is corrected using the look-up table, to a signal having a corrected tone level. The digital image signal thus corrected is converted to an analog signal by a D/A converter 115 and is compared with a triangular wave signal produced by a triangular wave generating circuit 117. A comparator 116 effects the comparison, and the output of the comparator 116 is a binary image signal having a pulse width modulated in accordance with the density. The binary image signal is supplied to a printer 118 to on-off-control the laser emission, so that the apparatus produces a halftone image. In this manner, the halftone image is produced by controlling the laser emission period.

The tone reproducing property ($\gamma$-property) of the system mainly depends on an input property (that is, the property of the CCD 111 converting the original image to an analog electric signal) and an output property (that is, the density property of the printer 118 which produces a final record image from the modulated pulse width). The CCD 111 generally exhibits a monotonous output property relative to the amount of light received thereby, and the printer 118 has a variety of properties depending on the types thereof.

FIG. 4 shows typical input and output properties when an electrophotographic type laser beam printer is used, and shows an example of the tone reproducing property correction ($\gamma$-correction).

The output (density) of the CCD 111 has the property shown in the first quadrant I relative to the density shown in the second quadrant II. In order to provide the faithful output property relative to the input image densities, the output of the CCD 111 is corrected ($\gamma$-correction) by the curve shown in the fourth quadrant IV. It will be understood that the tone corrector 114 of FIG. 3 has a correction table shown in the fourth quadrant.

However, when the temperature and/or the humidity around or inside the printer, various properties of the printer such as latent image property, the developing property and/or the transfer property with the result of variation in the output property of the printer shown in the third quadrant III of FIG. 4.

Then, the output densities relative to the input densities shown in the second quadrant changes with the result of different output image from the same original if the temperature and/or the humidity changes.

SUMMARY OF THE INVENTION

Accordingly, it is a principal object of the present invention to provide an image forming apparatus wherein the output properties thereof are corrected in accordance with the variation in the ambient condition such as the temperature or humidity, so that a stabilized image formation is possible.

It is another object of the present invention to provide an image forming apparatus capable of faithfully reproducing the tone of an original.

It is a further object of the present invention to provide an image forming apparatus capable of reproducing color images faithfully from original images.

According to an aspect of the present invention, there is provided an image forming apparatus, comprising: means for forming an image from image input data on a recording material with a tone reproducing property; means for detecting an ambient condition; and means for changing the tone reproducing property of said image forming means using one of stored tables in accordance with an output of said detecting means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 24 is a flow chart for introducing a new correction table.

DESCRIPTION OF THE PREFERRED EMBODIMENTS

Embodiment 1

Figure 1:
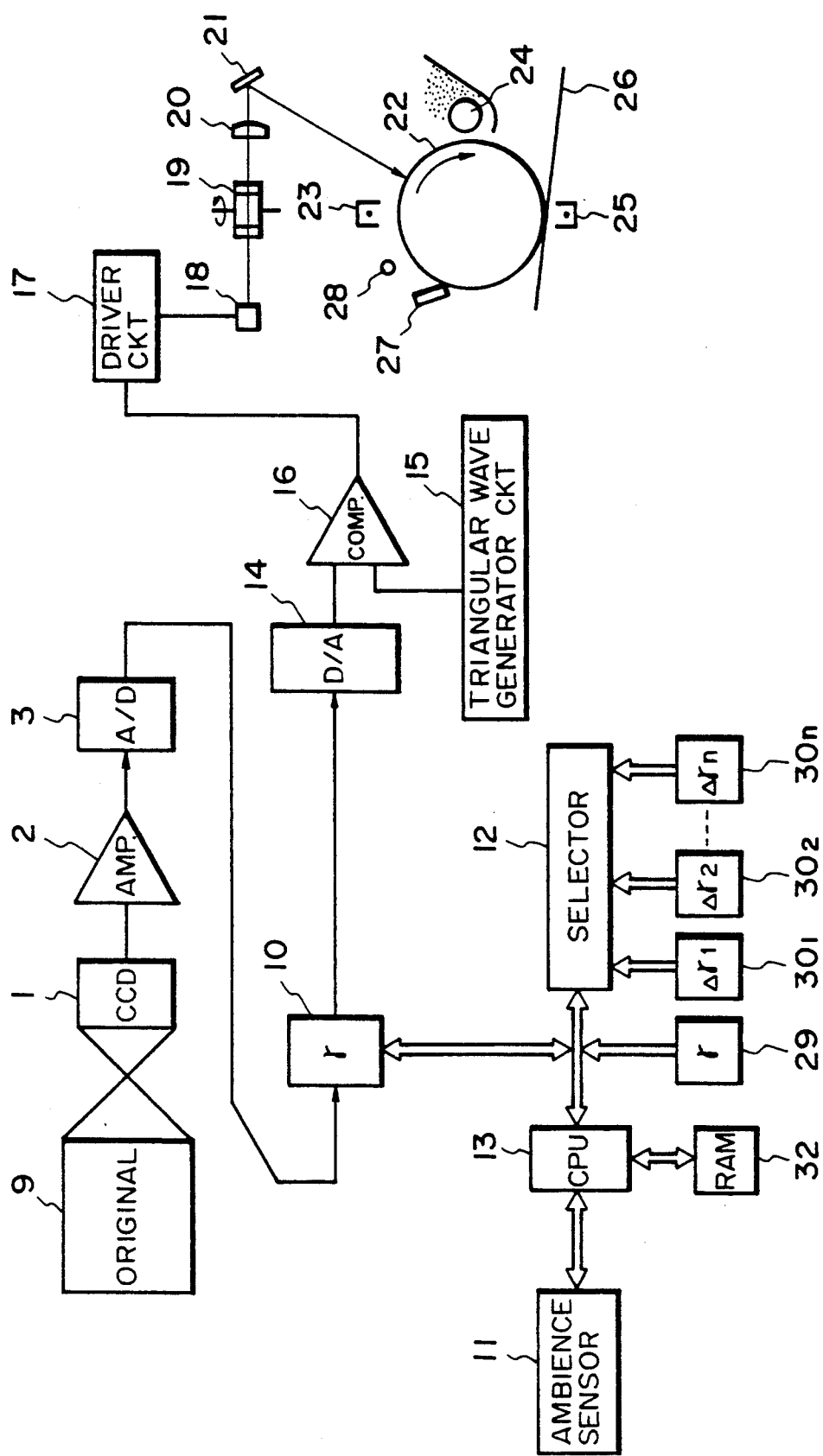
FIG. 1 is a block diagram of an image forming apparatus or an image processing apparatus according to an embodiment of the present invention.
Figure 2:
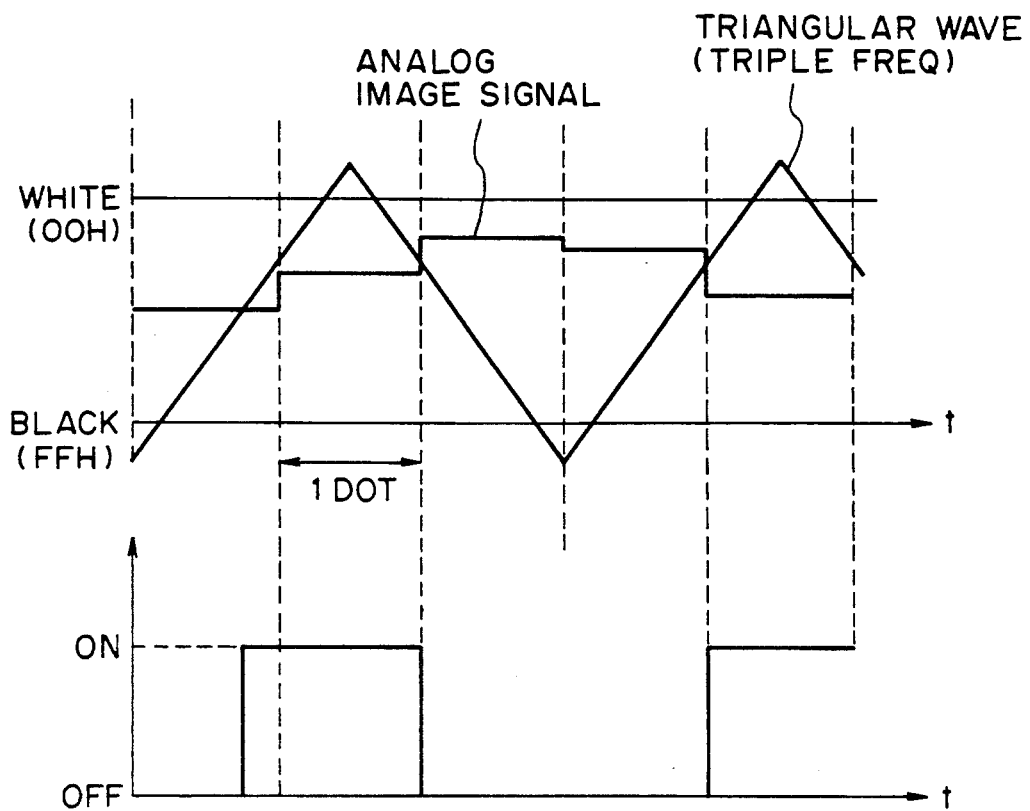
FIG. 2 is a graph illustrating a pulse width modulating operation.
Figure 3:
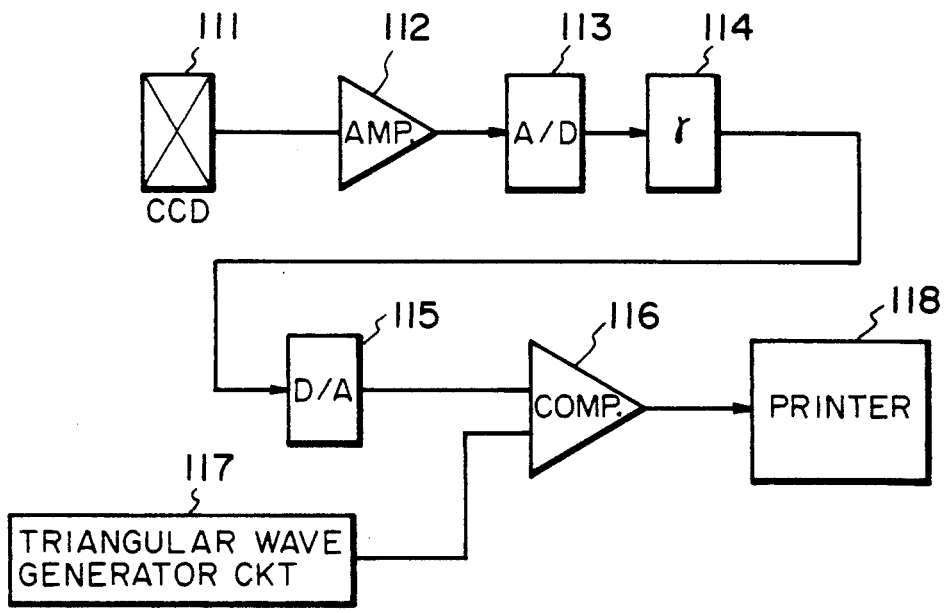
FIG. 3 is a block diagram of the image forming apparatus including a pulse width modulating circuit and a tone reproducing property correcting circuit.
Figure 4:
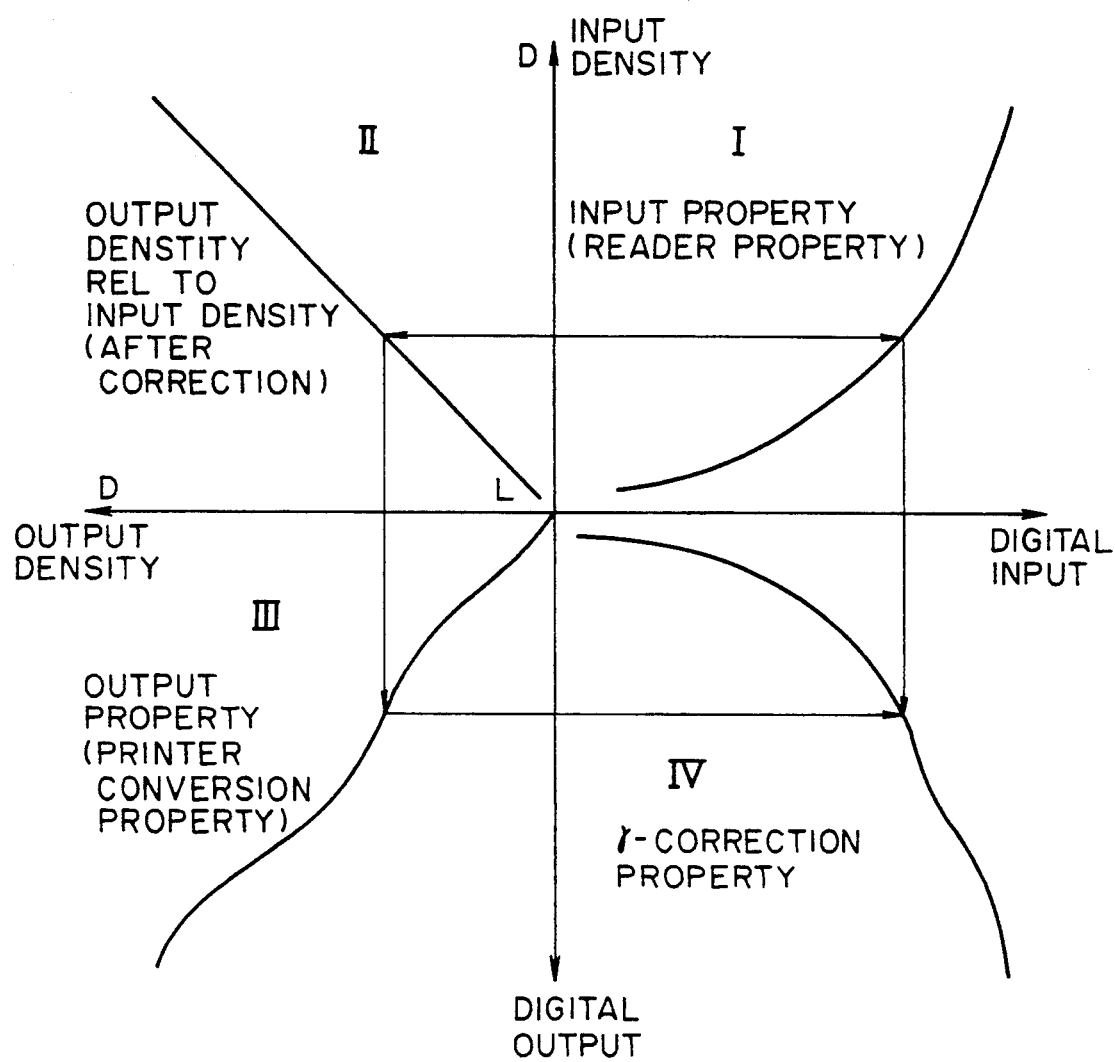
FIG. 4 illustrates input and output properties of a laser beam printer.

Main Structures (FIG. 1)

Referring to FIG. 1, there is shown a block diagram of an image processing apparatus according to a first embodiment of the present invention. In this embodiment, it is used with a laser beam printer. In the printer, a laser beam scans photosensitive drum in synchronism with reading of an original to form an image on the photosensitive drum.

An original 9 is read by a CCD 1, which produces an analog image signal, which in turn is amplified by an amplifier 2 to a predetermined level. Then, the signal is converted to an 8-bit digital image signal (0-255 tone levels) by an A/D converter 4. Then, the digital image signal is supplied to a tone reproducing property converter ($\gamma$-converter) 10 (a look-up table constituted by a RAM of 256 bites). An ambient condition sensor 11 includes a temperature sensor and a humidity sensor which are disposed at such a position that the moisture content in the developing device 24 is reflected well.

The correction ($\gamma'$) stored in the tone reproducing property converter 10 is written by an CPU 13 in accordance with temperature and/or humidity data detected by the ambience sensor 11. More particularly the CPU 13 selects one of correcting data $\Delta\gamma1, \ldots \Delta\gamma n$ (n: number of contrast flags which will be described hereinafter) from correction tables $30_1$-$30_n$ in accordance with an output of the ambience sensor 11. The correction data are added to the data relating to the $\gamma$ stored in the standard converting table 29 and the sum is written in the converter 10. The CPU 13 selects one of the correcting data $\Delta\gamma1 - \Delta\gamma n$ by controlling a selector 12.

Thus, the converter 10 produces the image data as the reference $\gamma$ + correcting $\Delta\gamma n$ ($=\gamma'$).

The digital image signal corrected in the $\gamma$-property by the converter 10 is supplied to a D/A converter 14. The digital signal is converted back to an analog signal, which is compared with a triangular wave having a predetermined frequency and produced by a triangular wave generating circuit 15, by a comparator 16. On the basis of the comparison by the comparator, the pulse widths of the signal is modulated. The binary image signals having been subjected to the pulse width modulation is supplied to a laser driving circuit 17 as it is, and is used for on-off-controlling the emission of the laser diode 18. The laser beam emitted from the laser diode 18 is scanned in a main scanning direction by a known polygonal mirror 19, and is projected through an $f-\theta$ lens 20 and a reflection mirror 21 onto a photosensitive drum 22, so that an electrostatic latent image is formed. Before the exposure of the photosensitive drum 22 to the laser beam, the photosensitive member is uniformly discharged by an illuminating means 28 and is then uniformly charged to a negative polarity by a charger 23. Thereafter, it is exposed to the above-described laser beam, so that the electrostatic latent image is formed thereon in accordance with the image signal. The printer of this embodiment is a so-called image scan type wherein the portion to receive the developer (black picture element) is exposed to the laser beam, and therefore, a developing device 24 is of a known reverse-development type, wherein that portion of the photosensitive drum which has been electrically discharged by the laser receives the negatively charged toner, so that a visualized image is formed. The visualized image (a toner image constituted by toner particles having the negative charge) is transferred from the photosensitive drum 21 to a transfer material (usually a sheet of paper) 26 by a transfer charger 25. The residual toner remaining on the photosensitive drum 22 is scraped off by a cleaner 27, and the photosensitive member is subjected to the above-described series of operations.

Figure 5:
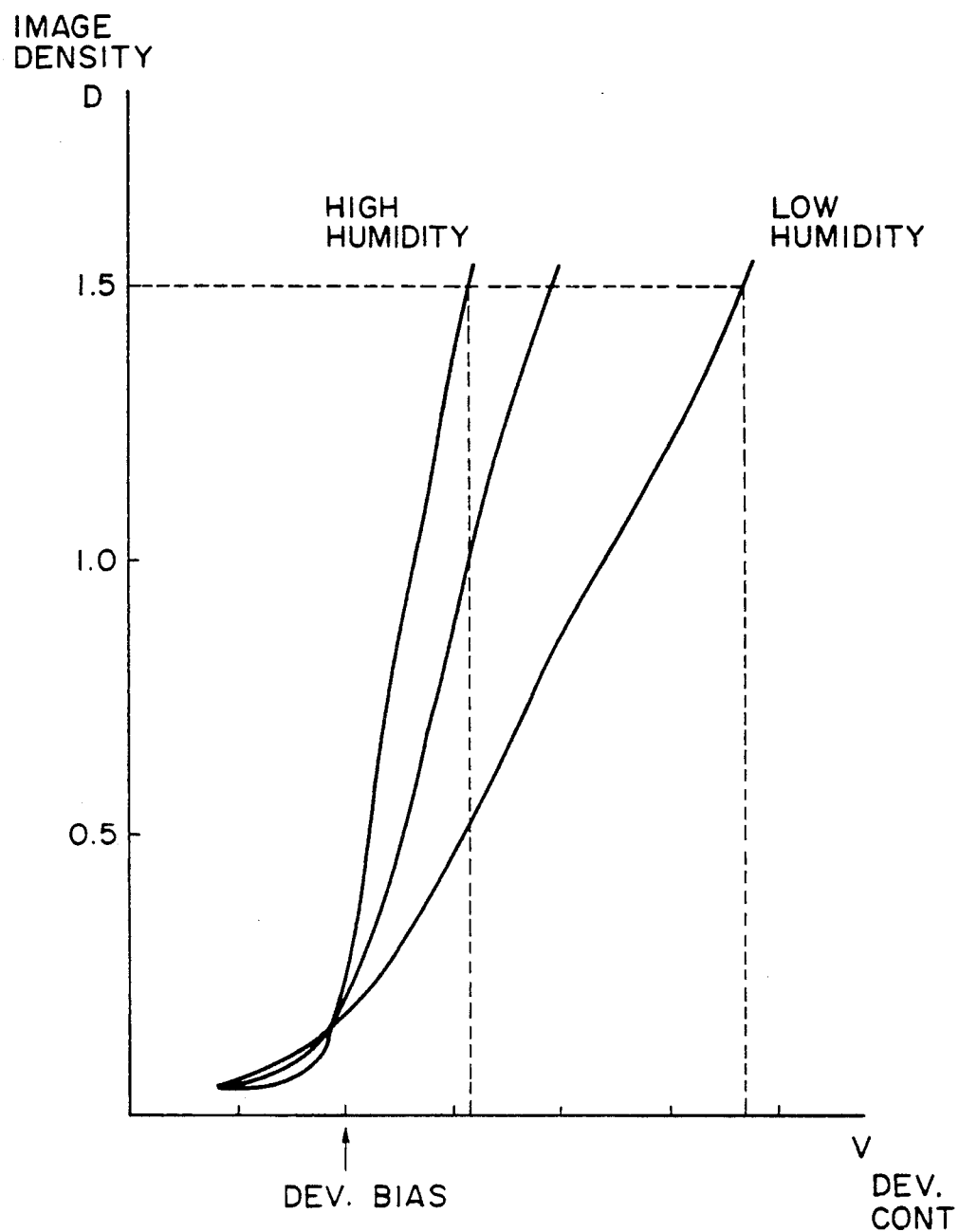
FIG. 5 is a graph showing the change of the image density relative to the humidity.

Humidity Detecting Means and Tone Reproducing Property Converter (FIG. 5)

Image density and tone reproducibility when the humidity changes and when the image forming operation is carried out under the same image forming condition. As will be understood, under the same image forming conditions, the density decreases when the humidity is low, and the density increases when the humidity is high. In addition, a high light image is reproduced in good order when the humidity is low, but the reproducibility is not good when the humidity is high.

Stabilized images can be provided under various ambient conditions, by an operation 1 wherein a contrast voltage is obtained and produced corresponding to the detected humidity and an operation 2 wherein a correction table for correcting the tone reproducing property is selected in accordance with an output of the operation 1, and by setting image formation parameters. More significant effects can be provided by using such structures in a printer for forming a multi-level full-color image using yellow, magenta, cyan and black colors. Where the changes in the density and/or the tone reproducing properties are different if the color is different, the image formation parameters are made changeable for the respective colors, by which the change in the image density and the tone reproducing property resulting from the difference in the color can be corrected. By doing so, the printer can provide a constant color balance despite the ambient condition changes.

Figure 6:
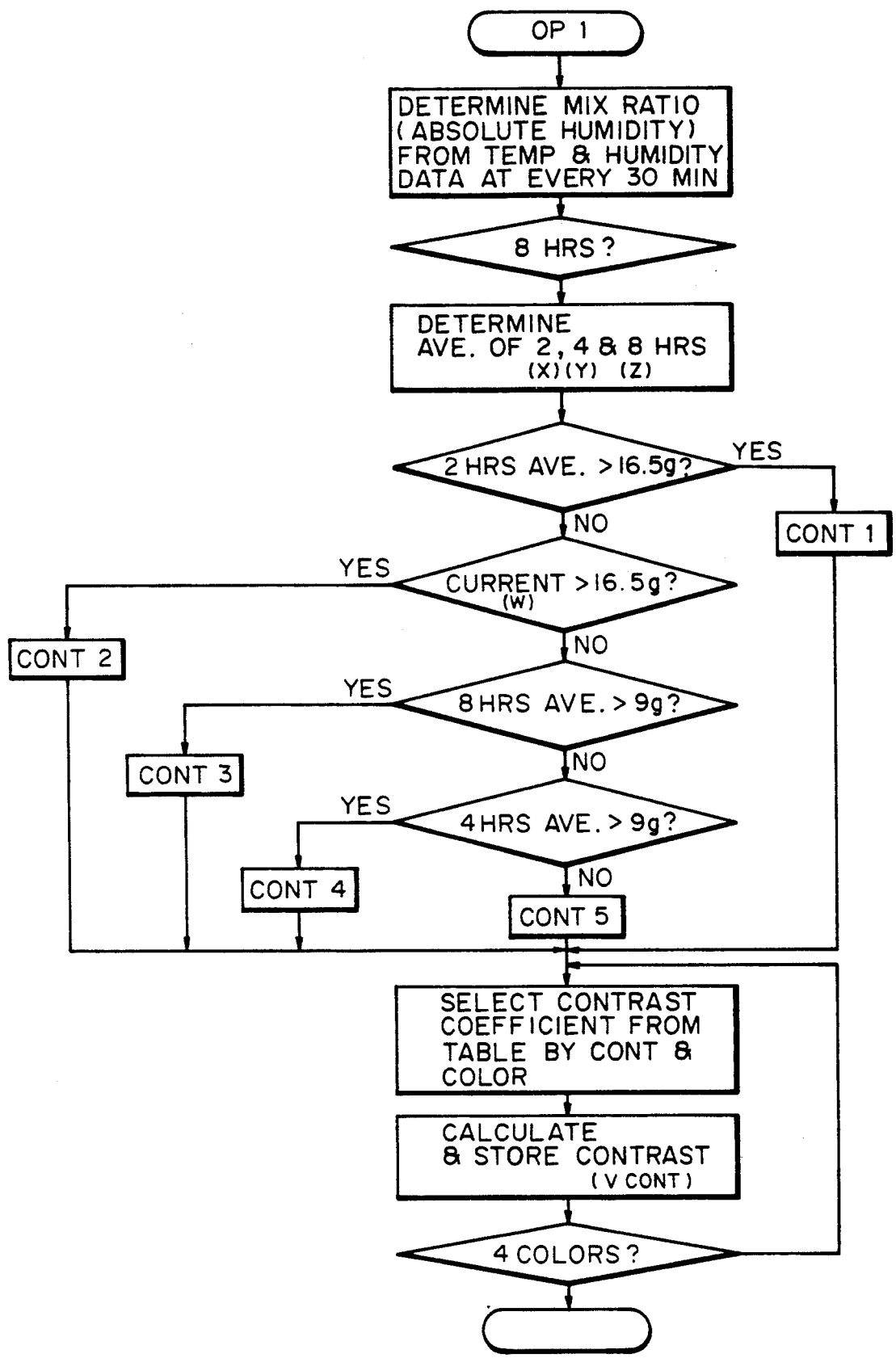
FIG. 6 is a flow chart of sequences of operation 1.

FIG. 6 is a flow chart showing the sequences of operation 1. The sequences are programmed and stored in an unshown ROM (not shown) in the CPU 13.

In operation, the temperature and the humidity are detected very 30 minutes by interruption process, or an average in 30 minutes are detected. Such data for 8 hours are stored in a buffer area in the memory 32. On the basis of the data, an absolute humidity or a value corresponding thereto (mixture ratio) is calculated. This is because it is considered that the image density is dependent on the absolute humidity, that is, quantity of the water.

The calculations of obtaining the absolute humidity (mixture ratio) are carried out for 8 hours data, and thereafter, the averages 2 hours, 4 hours and 8 hours are obtained. The data are used as a variable when the discrimination and the contrast calculation which will be described hereinafter are carried out. First discrimination is as to whether the 2-hour average of the mixture ratio is 16.5 g or larger or not. If so, the flag is set to CONT1. It is deemed that the high humidity condition has continued for two hours or longer. Then, the discrimination is made as to whether or not the current mixture ratio is 16.5 g or higher. If so, the flag is set to CONT2. It is deemed that the low humidity condition as continued for two hours, but now the humidity is increasing. Subsequently, the discrimination is made as to whether or not the 8 hours average mixture ratio is 9 g or larger. If so, the flag is set to CONT3. Then, it is deemed that an intermediate humidity condition continues for 8 hours or longer. Then, the discrimination is further made as to whether or not the 4 hour average mixture ratio is 9 g or larger. If so, the flag is set to 4. It is deemed that the humidity is changing from low level to an intermediate level. If not, that is, if the 4 hour average mixture ratio is smaller than 9 g, the low humidity is deemed and the flag is set to CONT5.

The above process is performed in consideration of the fact that the moisture absorbing speed and the moisture emission speed of the toner are different when the humidity is increasing from the low level to the high level than when it decreases from the high level to the low level. The image density is proportional to the absolute humidity, more correctly, it is determined on how much the toner absorbs the moisture. This is the reason why the above discriminations are made.

Next, the variables for the contrast calculation are determined on the basis of the contrast flag. If, for example, the flag is CONT1, that is, the high humidity has already influenced to everything, the variable is a three hour average x. If the content of the flag is CONT2, the state is between the low humidity and the high humidity, and the variable is $(x+w)/2$ which is an average of the three hour average x and the current level w.

Subsequently, the coefficients to be used in the calculation equation are searched four in a table in the memory on the basis of the contrast flag and the color information. The general equation of the calculation is $Vcont = a_1 - b_1 \times H$, where H is the variable described above, and $a_1$ and $b_1$ are the coefficients.

Using the coefficients and the variable, the contrast potential is calculated, and the above series of operations is repeated for the respective four colors.

Figure 7:
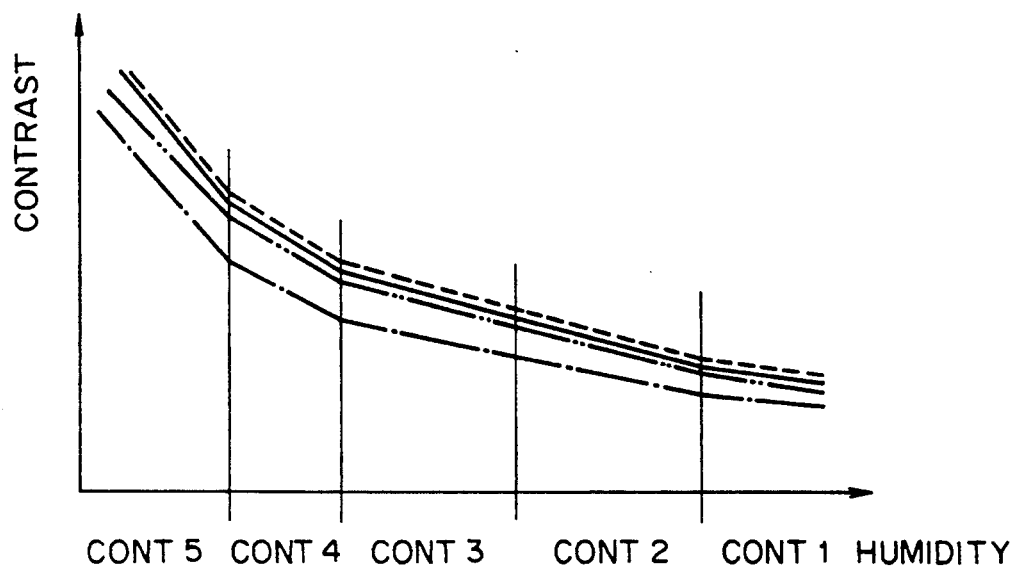
FIG. 7 is a graph showing changes of the contrast of developed image relative to the humidity.
Figure 8:
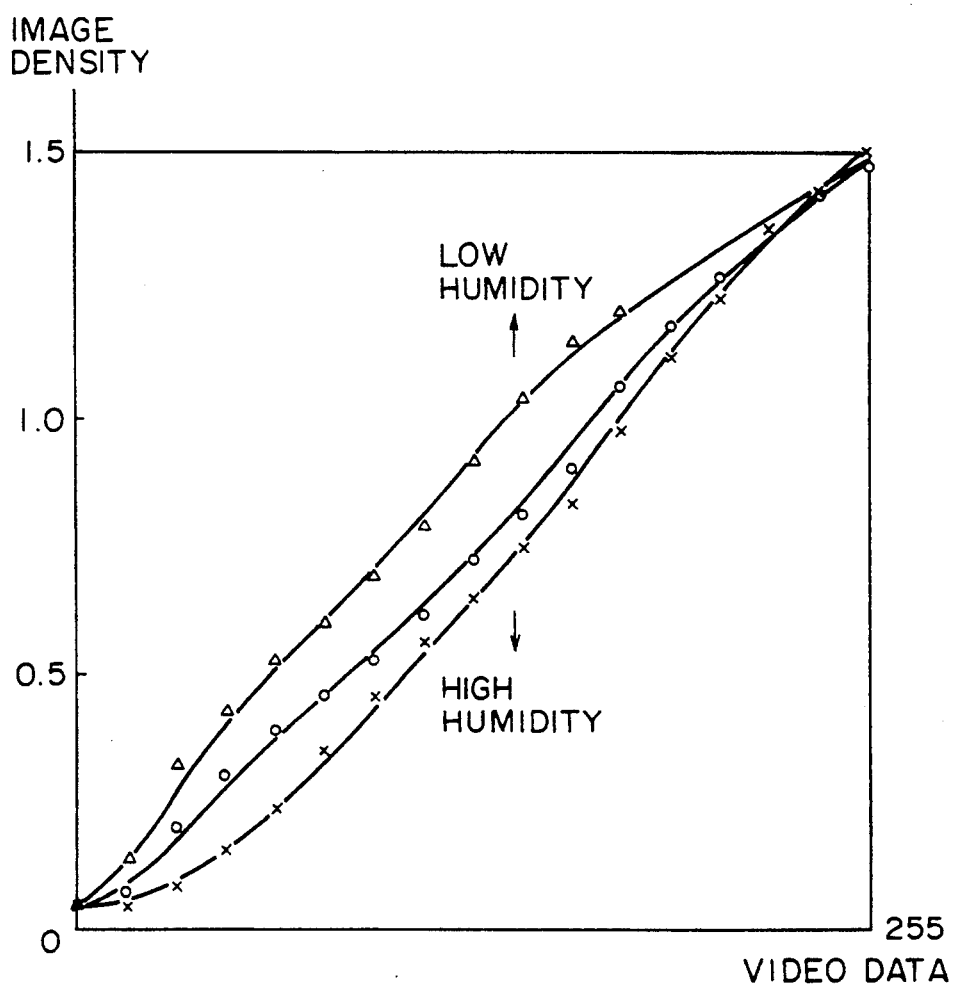
FIG. 8 is a graph of change of tone reproduction relative to the humidity.

FIG. 7 is plots of the results of calculations for the yellow, magenta, cyan and black colors. As will be understood, the coefficients are different for different colors, and therefore, the different changes in the image density for the different colors are properly compensated. This is shown in FIG. 8 which will be described hereinafter. The color balance and the tone reproducibility are improved by the above described contrast settings for the respective colors and the tone reproducing property correcting means which will be described hereinafter.

The description will next be made as to the operation 2 of the CPU 13 for selecting a correction table on the basis of the contrast voltage corresponding to the humidity. The sequences of the operation 2 is programmed and stored in an unshown ROM, similarly to the operation 1.

Figure 9:
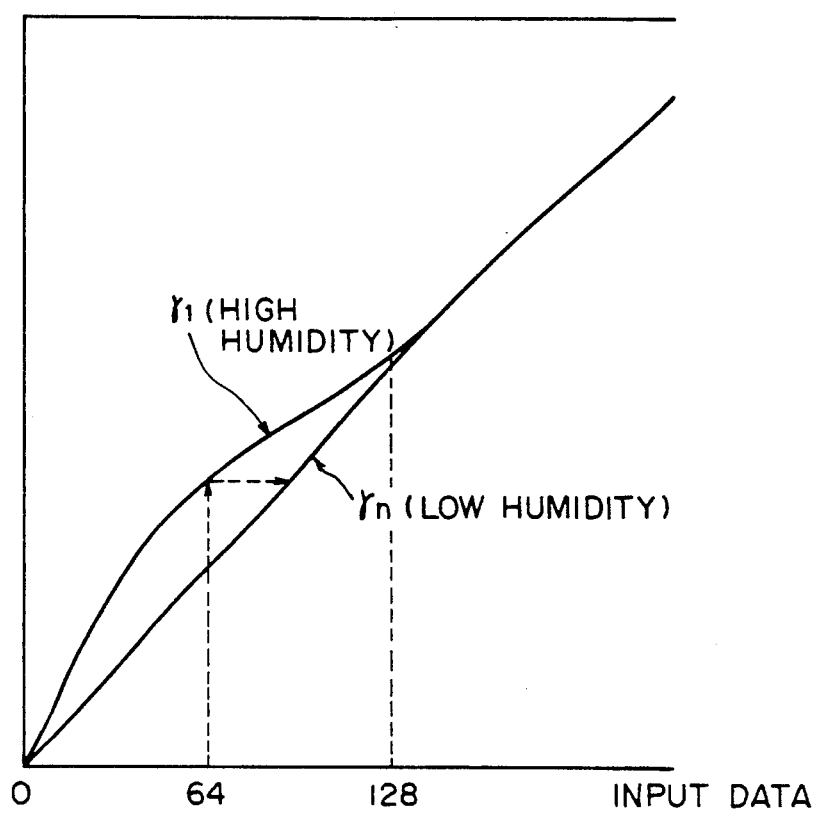
FIG. 9 is a graph illustrating operation 2.

As will be apparent from FIG. 8, it is possible to correct the density change by the operation 1, but the operation 1 is not able to correct the tone reproducing property. This is corrected by the operation 2. Referring to FIG. 9, this will be described. The correction table is an inverse function by standardizing the density axis of FIG. 8. In FIG. 9, the correcting table for the low humidity corresponds to $\gamma n$, and that for the high humidity is represented by $\gamma 1$.

Figure 10:
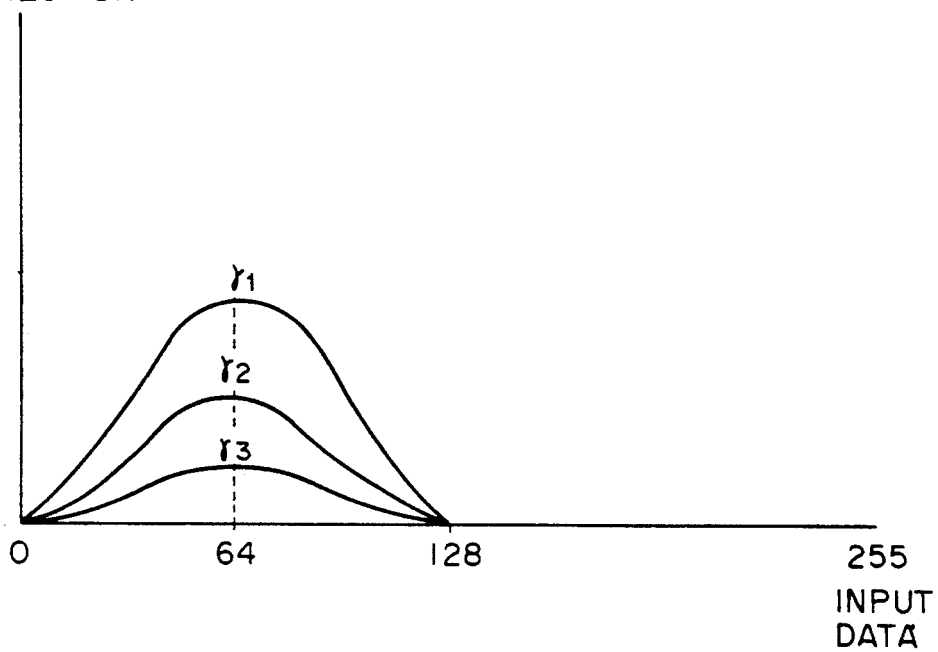
FIG. 10 is a graph representing a content of a correction table.

Then, a standard table is set. Then, amounts of corrections to input data are determined, so that correction tables $\Delta \gamma 1, \Delta \gamma 2, \ldots, \Delta \gamma n$ are made, where n is the number of the content of the flag in the operation 1. An example of such correcting tables are shown in FIG. 10.

When the output image is produced, one of the correction tables $\Delta \gamma 1, \ldots, \Delta \gamma n$ is selected in accordance with the content of the flag obtained by the operation 1. If, for example, the $\Delta \gamma 1$ is selected, and when it is CONT2, $\Delta \gamma n$ is selected. The sum of the standard $\gamma$ table 29 and the table $\gamma'$ is supplied to the $\gamma$-converter 10. The data converted by the converter 10 is used for the printing. The data for the $\gamma$ table can be properly selected by one skilled in the art. For example, the data of the standard table may be those of the table $\gamma n$ which is for the low humidity (under the low humidity condition, the amounts of corrections) are minimum due to the property of the developing device. Then, the number of correcting table is only $(n-1)$.

In another example, a blend $\gamma$ table is produced using known method, and the blend table is used as the reference $\gamma$ table. The blend method is to apparently concentrate the dots, by which the $\gamma$ conversion table or a pattern signal such as the triangular wave for determining the pulse width modulation upon formation of the output image, is switched for the individual lines of input image, so that the tone reproducing properties upon the output image formation ca be stabilized. The correction table $\Delta \gamma n$ is the tone reproduction (density) correcting table to the input data for each of the ambient conditions. Thus, it is possible that the dot concentration is effected by the standard table, and the tone reproduction correction is effected by the correcting table.

Embodiment 2

Figure 11:
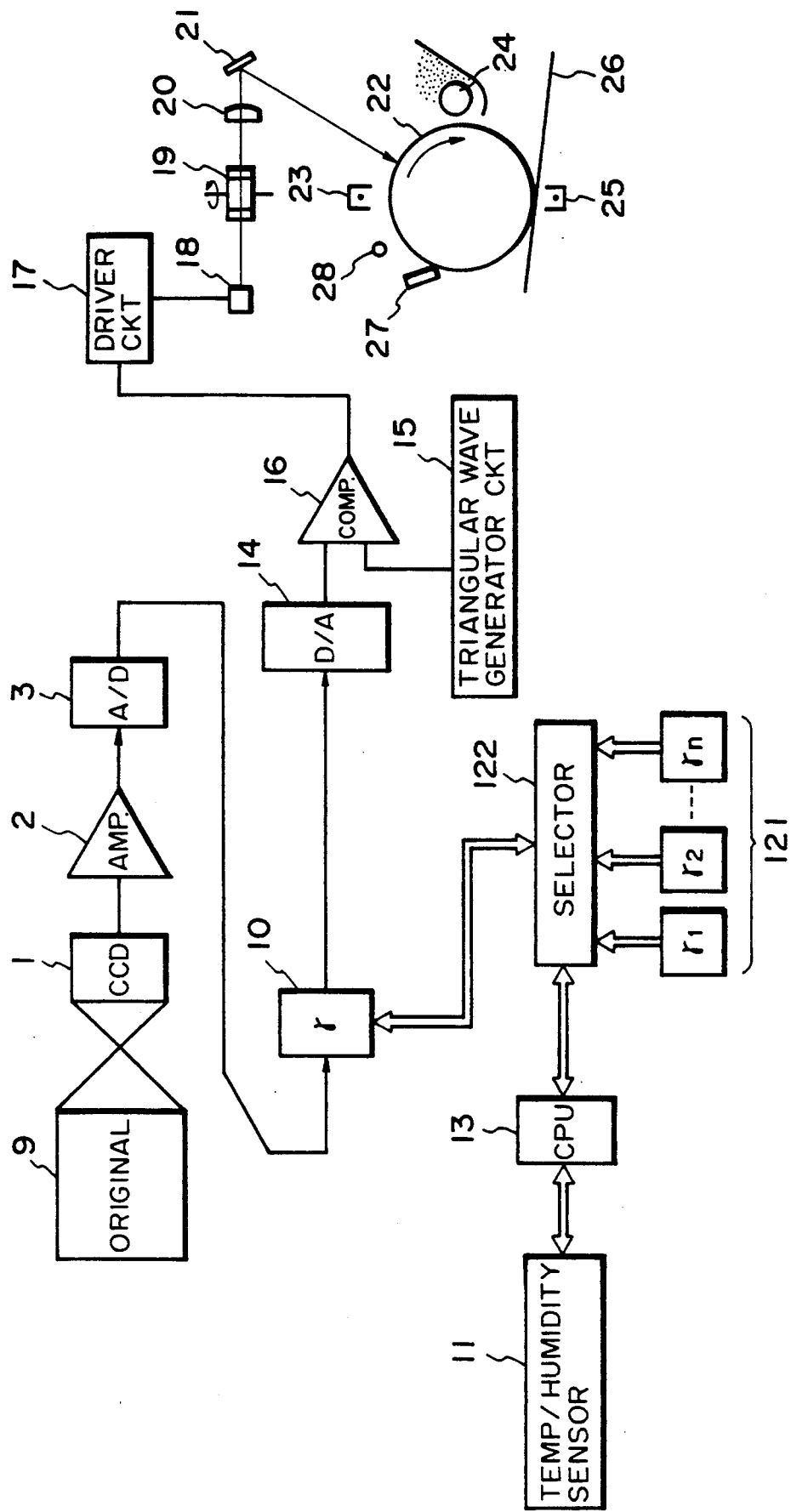
FIG. 11 is a block diagram of an image forming apparatus or an image processing apparatus according to another embodiment of the present invention.

FIG. 11 is a block diagram of an image forming apparatus according to a second embodiment of the present invention. In this embodiment, the image forming apparatus is in the form of a laser beam printer, too, wherein the laser beam scans the photosensitive drum in synchronism with reading of the original, so that an image is formed thereon. The same reference numerals as in FIG. 1 are assigned to the elements having the corresponding functions, and the description thereof are omitted for simplicity.

In this embodiment, as for the correction stored in the tone reproducing property converter ($\gamma$ converter) 10, one table is selected from a group of correcting tables 121 ($\gamma 1 - \gamma n$) (n is an integer larger than 1) on the basis of temperature and humidity data detected by temperature and humidity sensor 11.

Figure 12:
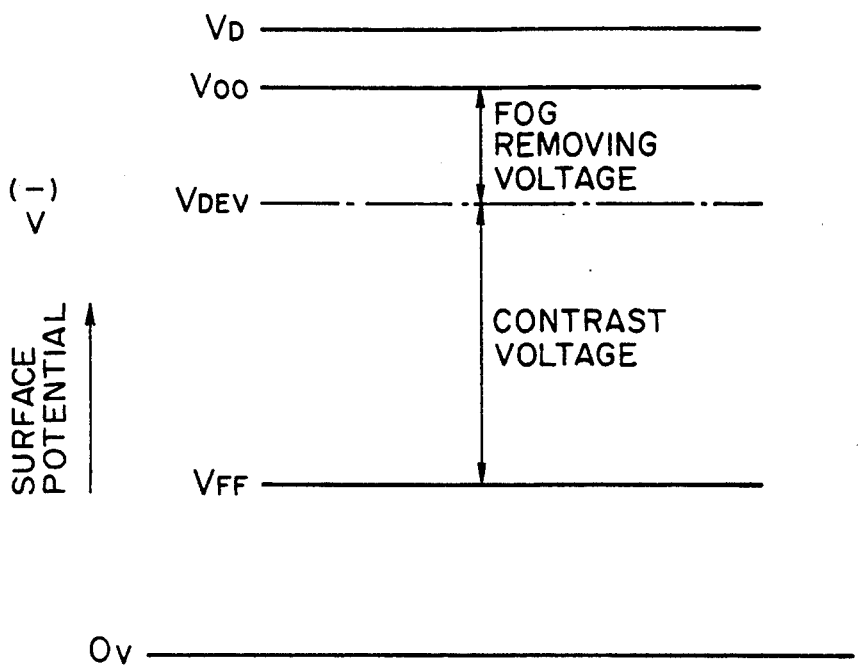
FIG. 12 illustrates contrast voltage.

FIG. 12 shows a surface potential of the photosensitive drum of the electrophotographic type printer in this embodiment, wherein $V_D$ is a dark portion potential which is the potential of the photosensitive drum before the exposure to the laser beam; $V_{OO}$ is the surface potential of the portion of the photosensitive drum which is exposed to the laser beam having the minimum pulse width, and which corresponds to the white portion of the image; $V_{FF}$ is the surface potential of the portion of the photosensitive drum which is exposed to the laser beam having the maximum pulse width and which corresponds to the black portion of the image. Since the image is processed in 8 bits, the potential of the photosensitive drum is discriminated as one of 256 levels between $V_{OO}$-$V_{FF}$, inclusive. In the Figure, $V_{DE}$ is a developing bias level applied to the sleeve of the developing device. The contrast voltage (Vcont or cont) is a potential difference between the developing bias potential and the black portion potential, and if given by:

$$Vcont = |V_{DE} - V_{FF}|$$

In this embodiment, the difference between the voltages $V_{OO}$ and $V_{DE}$ (fog preventing voltage) is controlled to be constant.

Figure 13:
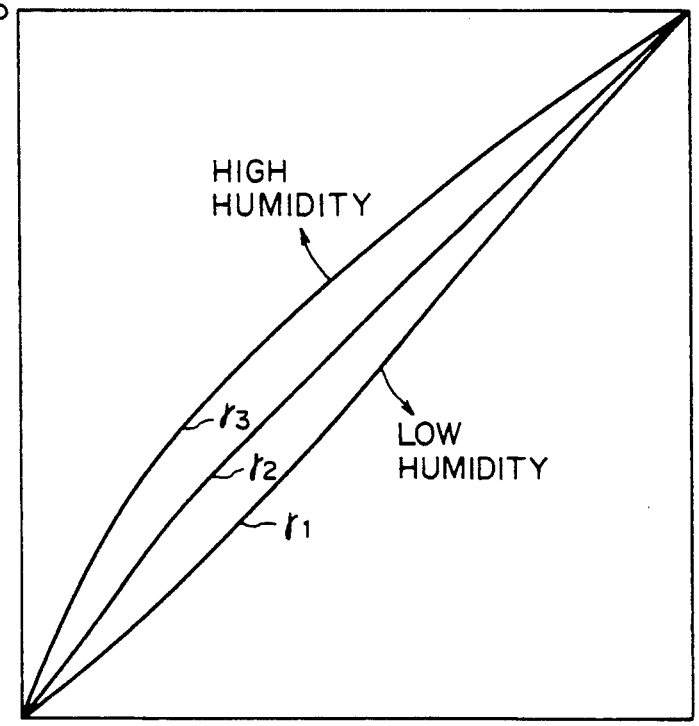
FIG. 13 is a graph illustrating a content of a correction table.

FIG. 13 shows a content of a correction table ($\gamma$ correction), which represents an inverse function made by standardizing the density axis of the graph of FIG. 8. Contents of low humidity correction table $\gamma$, an intermediate correction table $\gamma 2$ and a high humidity correction table $\gamma 3$ are shown.

Figure 14:
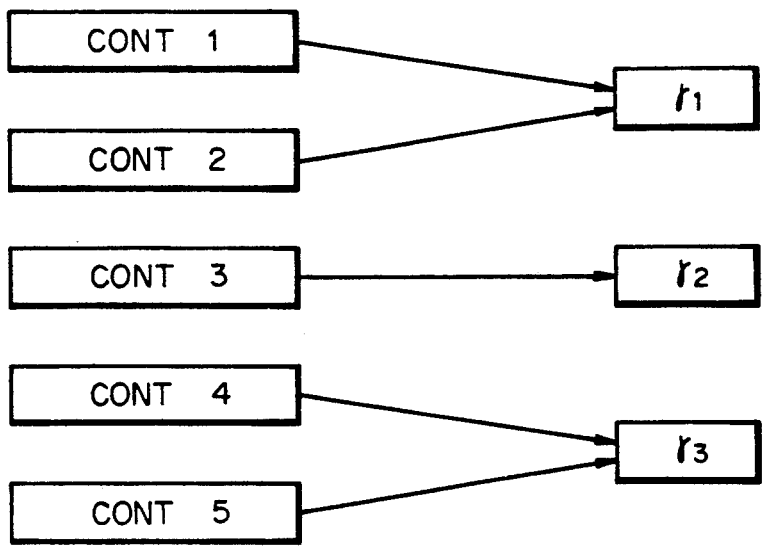
FIG. 14 is a block diagram showing correspondence between the contrast voltage and the correction tables.

When the image output is produced, one of the correction tables $\gamma 1 - \gamma 3$ is selected on the basis of the content of the flag determined by the operation 1 which is the same as the operation 1 in the first embodiment. The correspondence in this embodiment is shown in FIG. 14. The operations are carried out by the CPU 13 (FIG. 11) using a selector 122.

The selected correction table is stored in the $\gamma$ converter 10 in FIG. 11, and is compared with an image input data, and on the basis of the comparison, an output data (video data) are produced.

Figure 15:
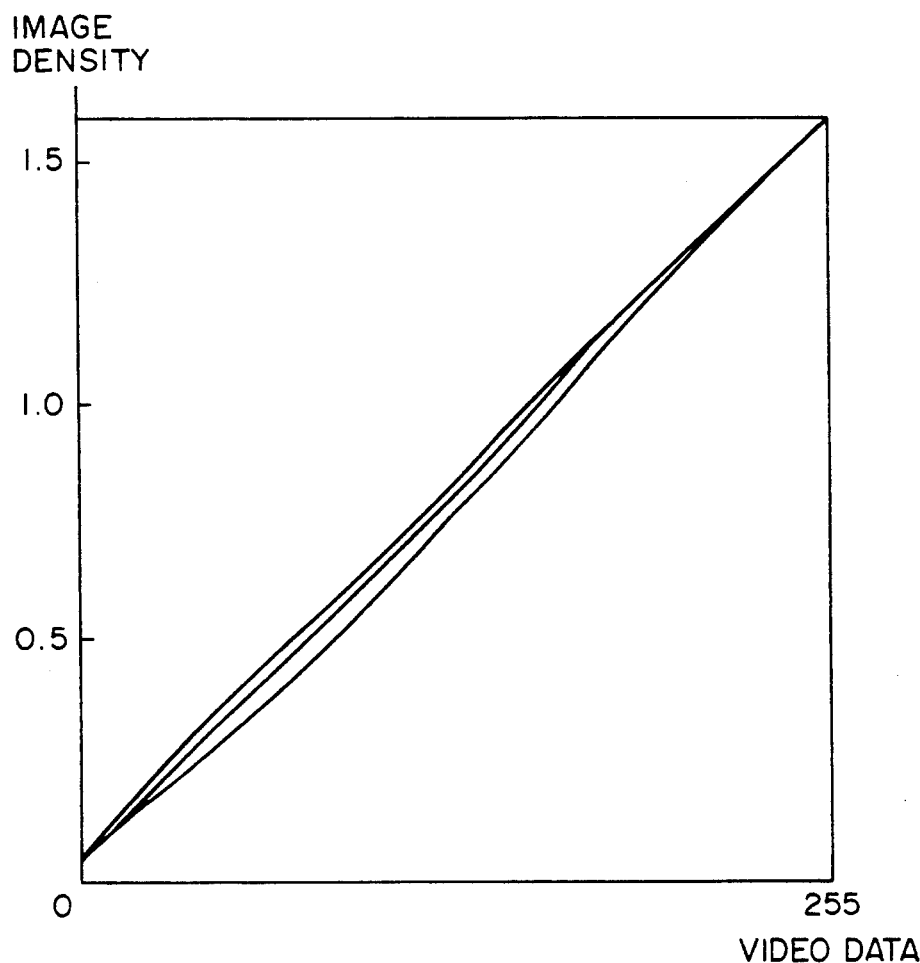
FIG. 15 is a graph representing the tone reproduction in the apparatus of the second embodiment.

The correction tables $\gamma 1 - \gamma 3$ may be properly determined by one skilled in the art. FIG. 15 shows the image density of the output image on the basis of the operation 2 vs. video data. As will be understood when this is compared with the data of FIG. 8, the image densities are substantially constant irrespective of the variation in the ambient conditions.

In this embodiment, the number of correcting tables ($\gamma 1$, $\gamma 2$ and $\gamma 3$) is three. It is possible to increase the number so that more accurate control is possible.

Embodiment 3

The third embodiment of the present invention is different from the second embodiment in the operation 2. The operation 1 is the same as the first embodiment.

In this embodiment, two basic correcting tables are prepared, and a proper correcting table is calculated out using the two basic tables, and it is stored in the converter 10.

Figure 17:
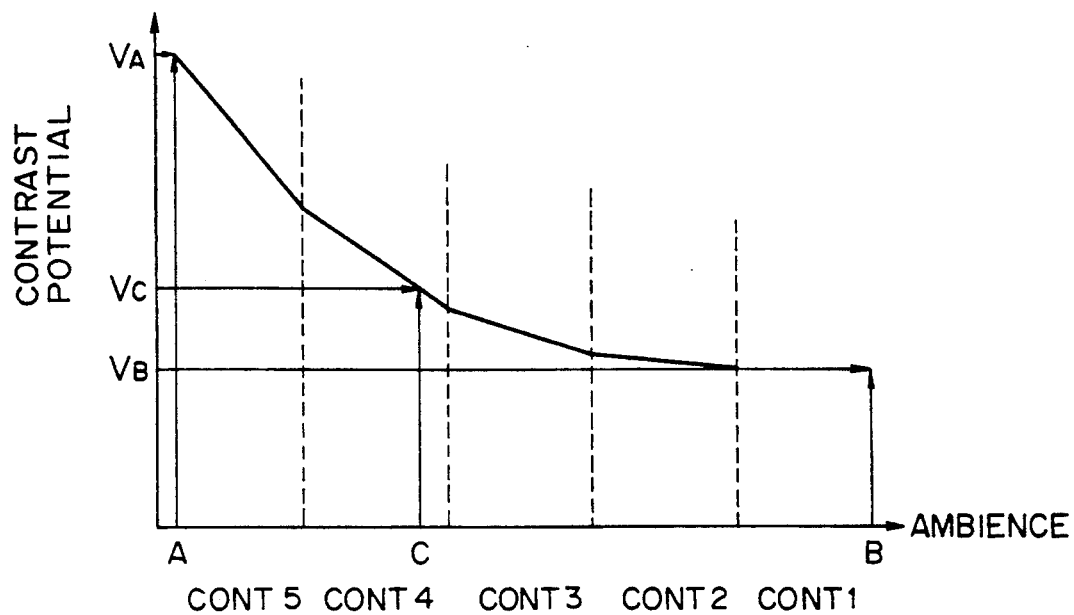
FIG. 17 is a graph showing basic setting and the contrast voltages.

As shown in FIG. 17, the basic correcting tables are based on the two extreme ambient conditions, in this embodiment. In this Figure, A represents the low temperature and low humidity condition, and the proper contrast voltage is $V_A$ provided by the above-described operation 1; B represents the high temperature and high humidity, and the proper contrast voltage at this time is $V_B$.

Figure 18:
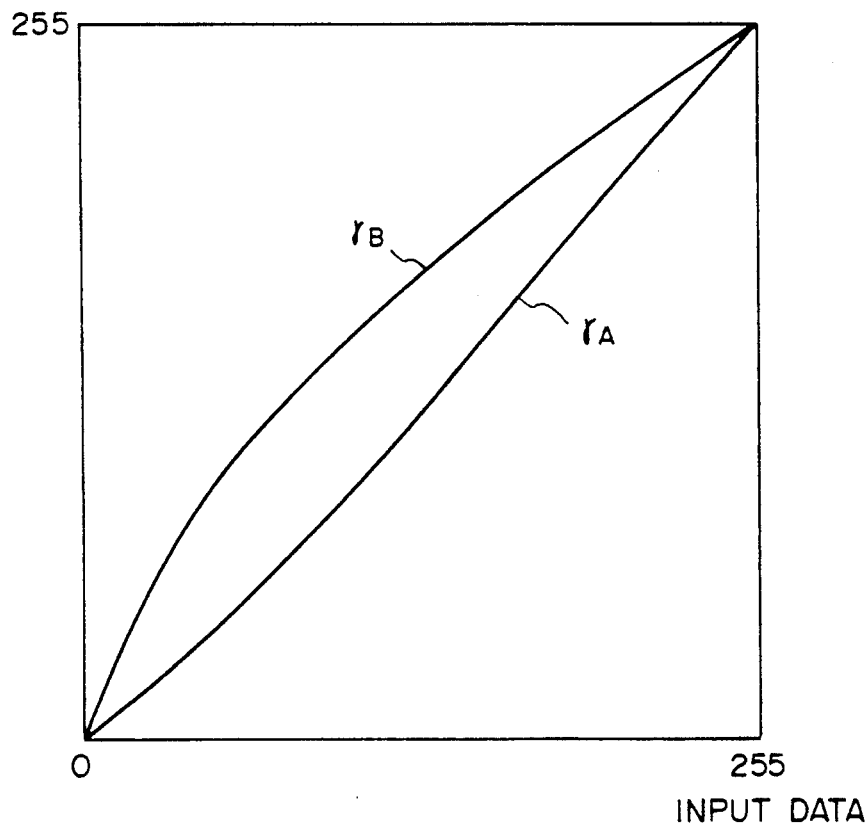
FIG. 18 is a graph showing the content of a correcting table of the basic settings.

FIG. 18 shows the proper correcting tables under the conditions A and B ($\gamma_A$ and $\gamma_B$). The data are stored in the memory such as ROM or the like, and are used as basic data.

An example of an operation up to the output image formation will be described. It is assumed that the contrast voltage calculated by the operation 1 on the basis of the data from the temperature and humidity sensor is $V_C$, and the ambient condition is C. In the operation, the proper correcting table $\gamma_C$ under the ambient condition C is produced from the predetermined correcting tables $\gamma_A$ and $\gamma_B$ by interpolating a curve from the curves $\gamma_A$ and $\gamma_B$.

Figure 20:
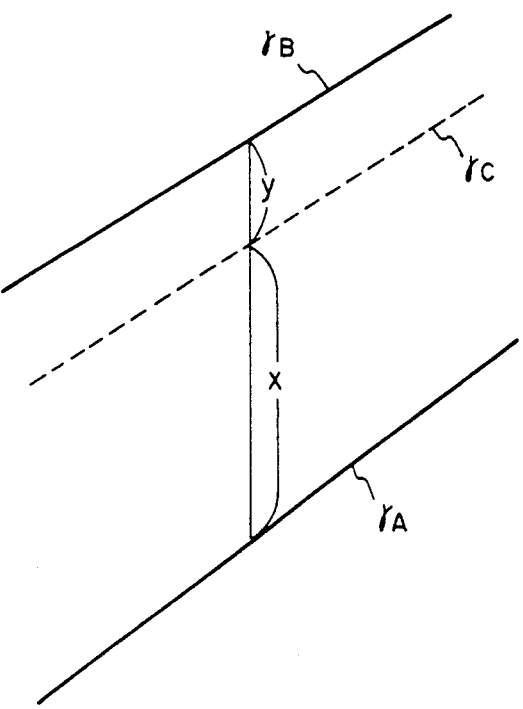
FIG. 20 illustrates interpolation.

Referring to FIG. 20, the ratio (x, y) of interpolation between the curves $\gamma_A$ and $\gamma_B$ are given by the following:

$$x = (V_A - V_C)/(V_A - V_B)$$

$$y = (V_C - V_B)/(V_A - V_B)$$

For example, if $V_A = 450$ V, $V_B = 150$ V, $V_C = 200$ V, then x is about 0.83, and y is about 0.17.

From the data $\gamma_{An}$ and $\gamma_{Bn}$ of the correcting tables corresponding to the input data, the required correcting table data $\gamma_{Cn}$ is given by:

$$\gamma_{Cn} = x\gamma_{Bn} + y\gamma_{An}$$

Figure 19:
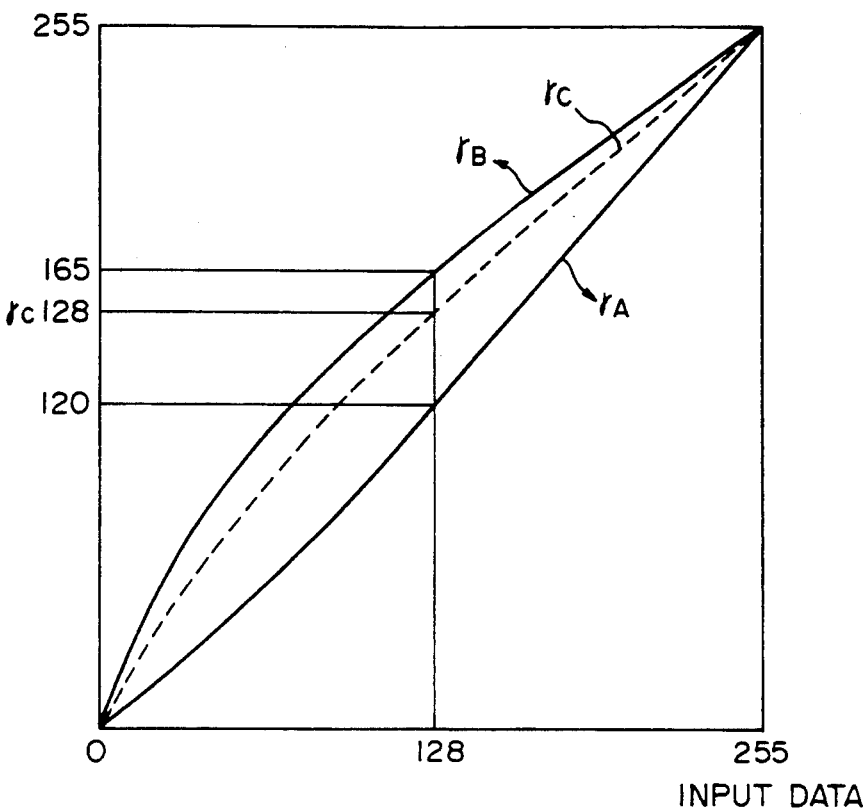
FIG. 19 is a graph illustrating formation of a new correcting table.

As shown in FIG. 19, for example, if the input data is at the level of 128, then $$\begin{aligned}\gamma_{C128} &= x\gamma_{B128} + y\gamma_{A128} \\ &= 0.83 \times 165 + 0.17 \times 120 \\ &= 157 \text{ (approx.)}\end{aligned}$$

By effecting the above processing for all of the tone levels of input data, the correcting data for $\gamma C$ is produced as shown in FIG. 19.

Figure 16:
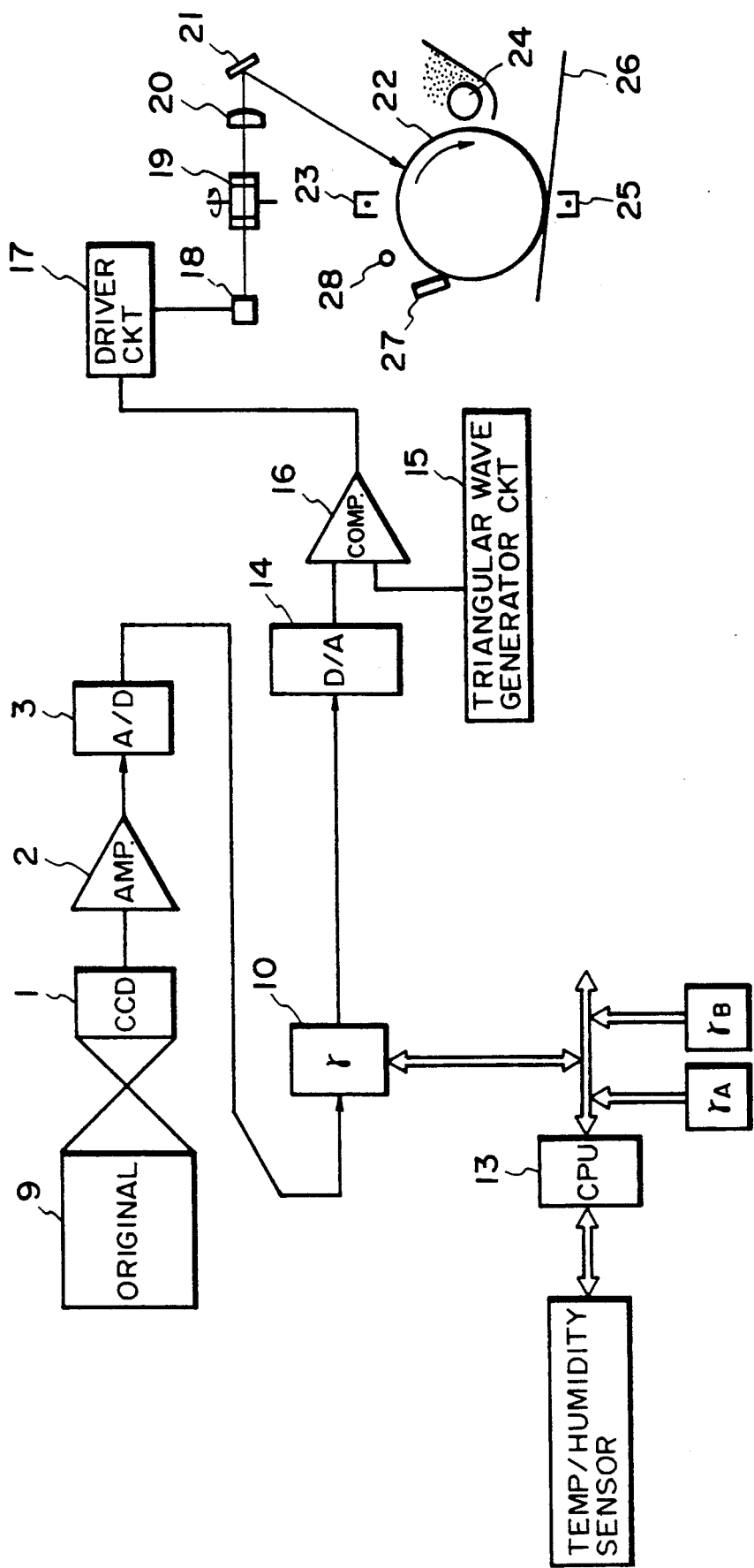
FIG. 16 is a block diagram of an image forming apparatus according to a third embodiment of the present invention.

The table produced by the operation is stored in the converter 10 in FIG. 16.

FIG. 16 is a block diagram of the system of this embodiment. This embodiment is particularly effective because of the smaller memory required for the correcting tables, when the ratio of the contrast potentials and the ratio of the corresponding correcting tables are in proportional relation or when the dependency of the image density and the tone reproducibility on the ambience is not very significant.

Embodiment 4

Figure 22:
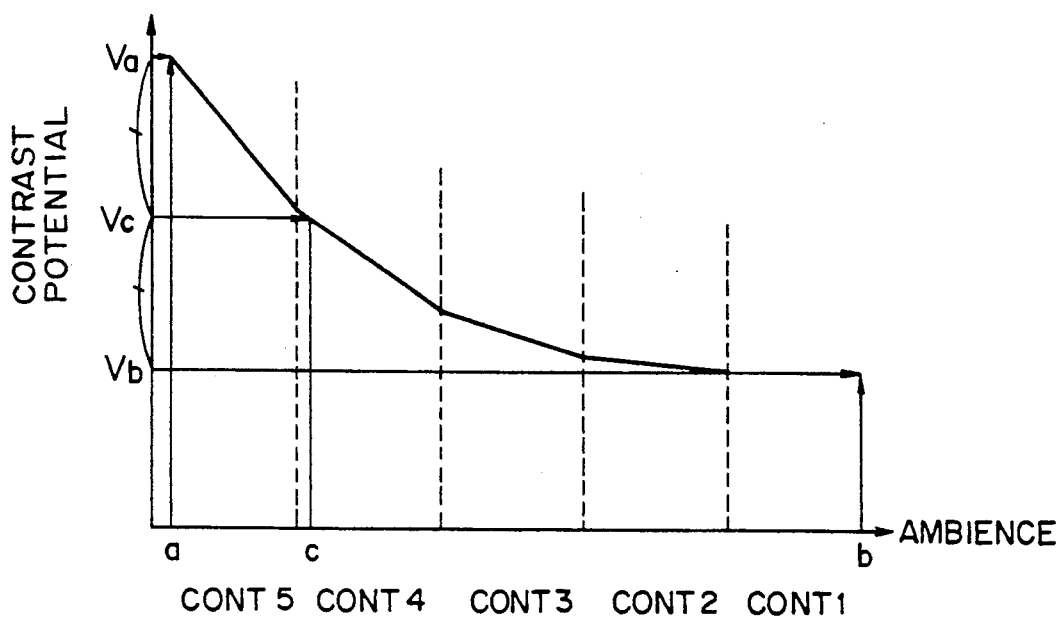
FIG. 22 is a graph showing basic settings and contrast voltages.
Figure 23:
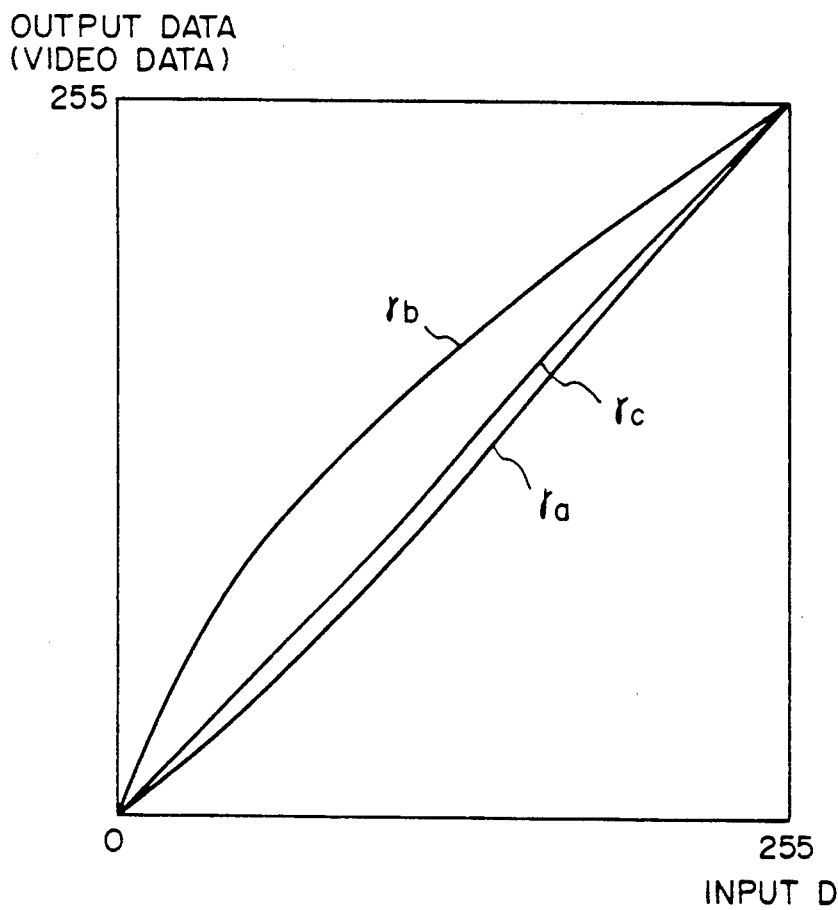
FIG. 23 is a graph showing a content of correction table of the basic settings.

FIG. 22 shows an example of proper contrast voltages Va, Vb and Vc under different ambient conditions a, b and c. FIG. 23 shows the corresponding three proper correcting tables obtained from actual images. In this case, the proper image reproduction is not effected in the third embodiment.

In such a case, the discrimination is made as to whether which of the following conditions is satisfied:

$$Va \leqq Vd < Vc$$

$$Vc \leqq Vd \leqq Vb$$

where Vd is the contrast voltage obtained by the operation 1, and d is the ambient condition. The discrimination is made on the basis of the data from the temperature and humidity sensor of the printer, then the control as in the third embodiment is effected.

FIG. 24 shows the system in this case. The data $\gamma$ in the algorithm for effecting this is stored in the $\gamma$ converter in FIG. 21.

Figure 21:
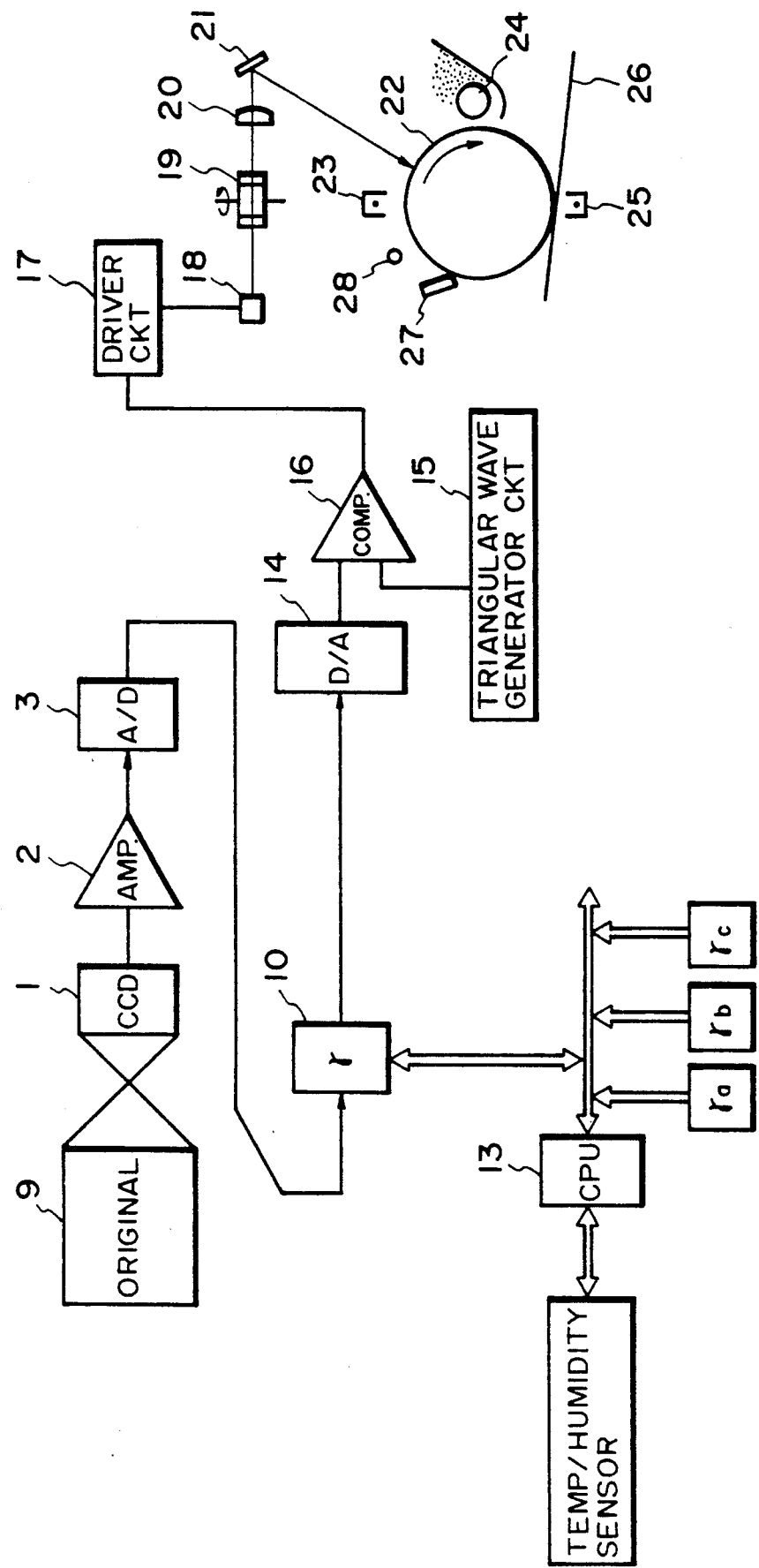
FIG. 21 is a block diagram of an image forming apparatus according to a fourth embodiment of the present invention.

FIG. 21 is a block diagram of the system in this embodiment.

In the third and fourth embodiments, the data are supplemented by the interpolation, but is also possible to produce data by extrapolation using the concept of this invention.

In the foregoing, the description has been made as to the case of reverse development in the image portion scan type image formation, but the present invention is similarly applicable to a regular development in a background scan type image formation wherein the background (white) portion of the image is exposed to light. The present invention is applicable with the same advantageous effects to other types of printers, such as thermal transfer type printer wherein the pulse width for the heat generating period is modulated. Therefore, the present invention is applicable to all of the printers wherein the area modulation is possible. The present invention is applicable to a black-white printer, monochromatic printer, a full-color printer or the like in the similar manner.

As described in the foregoing, even if the image output is changeable depending on the inside and outside ambient conditions (temperature, humidity) of the machine, the stabilized image density and the tone reproduction are possible by the use of the tone reproducing property changing means such as correction tables, corresponding to the ambient conditions.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
   means for forming an image from image input data on a recording material with a tone reproducing property;
   means for detecting an ambient condition; and
   means for changing the tone reproducing property of said image forming means in accordance with a parameter determined by predetermined tables made for a plurality of predetermined ambient conditions, wherein when the detected ambient condition is deviated from any of said predetermined ambient conditions, the parameter is determined by interpolation using said tables.

2. An apparatus according to claim 1, wherein the input data are produced by reading original by a CCD.

3. An apparatus according to claim 1, wherein the input data are produced from an original by a CCD and an A/D converter.

4. An apparatus according to claim 1, wherein said detecting means detects a humidity.

5. An apparatus according to claim 1, wherein said detecting means detects a humidity and a temperature.

6. An apparatus according to claim 1, wherein said image forming means including an electrophotographic photosensitive member and latent image forming means for forming a latent image thereon.

7. An apparatus according to claim 1, wherein said changing means adds to data of the stored table data in accordance with an output of said detecting means.

8. An apparatus according to claim 1, wherein said changing means modifies the stored table using a coefficient in accordance with an output of said detecting means.

9. A color image forming apparatus, comprising:
   an electrophotographic photosensitive member;
   means for forming latent images by optical scanning means with light information corresponding to colors;
   plural developing means for developing in different colors;
   means for detecting an ambient condition; and
   means for changing a tone reproducing property of said image forming means in accordance with a parameter determined by predetermined tables made for a plurality of predetermined ambient conditions, wherein when the detected ambient condition is deviated from any of said predetermined ambient conditions, the parameter is determined by interpolation using said tables.

10. An apparatus according to claim 9, wherein the light information corresponds to color separated images of a full-color image, and said developing means develops the latent images with yellow, magenta and cyan developers.

11. An apparatus according to claim 10, wherein the light information is data produced by reading an original by a CCD.

12. An apparatus according to claim 10, wherein the light information is data produced by reading an original by a CCD and an A/D converter.

13. An apparatus according to claim 10, wherein said apparatus is an electrophotographic copying apparatus.

14. An apparatus according to claim 9, wherein said optical scanning means uses a laser beam.

15. A color image forming apparatus, comprising:
   an electrophotographic photosensitive member;
   means for forming latent images by optical scanning means with light information corresponding to colors;
   plural developing means for developing in different colors;
   means for detecting an ambient condition; and
   means for changing a tone reproducing property of said image forming means in accordance with a parameter determined by predetermined tables made for a plurality of predetermined ambient conditions, wherein when the detected ambient condition is deviated from any of said predetermined ambient conditions, the parameter is determined by interpolation using said tables.

16. An apparatus according to claim 15, wherein the light information corresponds to color separated images of a full-color image, and said developing means develops the latent images with yellow, magenta and cyan developers.

17. An apparatus according to claim 16, wherein the light information is data produced by reading an original by a CCD.

18. An apparatus according to claim 16, wherein the light information is data produced by reading an original by a CCD and an A/D converter.

19. An apparatus according to claim 16, wherein said apparatus is an electrophotographic copying apparatus.

20. An apparatus according to claim 15, wherein said optical scanning means uses a laser beam.

21. An apparatus according to claim 15, wherein said changing means adds to data of the stored table data in accordance with an output of said detecting means.

22. An apparatus according to claim 15, wherein said changing means modifies the stored table using a coefficient in accordance with an output of said detecting means.

23. A color image forming apparatus, comprising:
an electrophotographic photosensitive member;
means for forming latent images by optical scanning means with light information corresponding to colors;
plural developing means for developing in different colors;
means for detecting an ambient condition;
means for changing a tone reproducing property of said image forming means in accordance with a parameter determined by predetermined tables made for a plurality of predetermined ambient conditions, wherein when the detected ambient condition is deviated form any of said predetermined ambient conditions, the parameter is determined by interpolation using said tables; and
means for receiving an output of said charging means, for comparing it with a predetermined triangular wave and for producing a pulse-width-modulated binary signal to drive said optical scanning means.

24. An apparatus according to claim 23, wherein the light information corresponds to color separated images of a full-color image, and said developing means develops the latent images with yellow, magenta and cyan developers.

25. An apparatus according to claim 24, wherein the light information is data produced by reading an original by a CCD.

26. An apparatus according to claim 24, wherein the light information is data produced by reading an original by a CCD and an A/D converter.

27. An apparatus according to claim 24, wherein said apparatus is an electrophotographic copying apparatus.

28. An apparatus according to claim 23, wherein said optical scanning means uses a laser beam.

29. A color image forming apparatus, comprising:
an electrophotographic photosensitive member;
means for forming latent images by optical scanning means with light information corresponding to colors;
plural developing means for developing in different colors;
means for detecting an ambient condition;
means for changing a tone reproducing property of said image forming means in accordance with a parameter determined by predetermined tables made for a plurality of predetermined ambient conditions, wherein when the detected ambient condition is deviated from any of said predetermined ambient conditions, the parameter is determined by interpolation using said tables; and
means for receiving an output of said changing means, for comparing it with a predetermined triangular wave and for producing a pulse-width-modulated binary signal to drive said optical scanning means.

30. An apparatus according to claim 29, wherein the light information corresponds to color separated images of a full-color image, and said developing means develops the latent images with yellow, magneta and cyan developers.

31. An apparatus according to claim 30, wherein the light information is data produced by reading an original by a CCD.

32. An apparatus according to claim 30, wherein the light information is data produced by reading an original by a CCD and an A/D converter.

33. An apparatus according to claim 30, wherein said apparatus is an electrophotographic copying apparatus.

34. An apparatus according to claim 29, wherein said optical scanning means uses a laser beam.

35. An apparatus according to claim 29, wherein said changing means adds to data of the stored table data in accordance with an output of said detecting means.

36. An apparatus according to claim 29, wherein said changing means modifies the stored table using a coefficient in accordance with an output of said detecting means.

* * * * *

UNITED STATES PATENT AND TRADEMARK OFFICE
CERTIFICATE OF CORRECTION

PATENT NO. : 5,313,308
DATED : May 17, 1994
INVENTOR(S) : Takashi Hasegawa and Sono Gu It is certified that error appears in the above-identified patent and that said Letters Patent is hereby corrected as shown below:

On the title page under [56], References Cited, insert:

--4,876,556  10/1989  Ohara ..............346/108

FOREIGN PATENT DOCUMENTS 276,107  7/1988  European Patent Office
269,033  6/1988  European Patent Office--

Column 4, line 50, change "drum 21" to --drum 22--.

Column 5, line 21, change "very" to --every--;
line 42, change "as" to --has--; and
line 66, delete "to".

Column 6, line 4, change "four" to --for--; and
line 65, change "ca" to --can--.

Column 7, line 40, change "if" to --is--.

Column 10, line 17, change "including" to --includes--.

Signed and Sealed this

Fifteenth Day of November, 1994

Attest:

BRUCE LEHMAN

*Attesting Officer*      *Commissioner of Patents and Trademarks*